Figure 20:
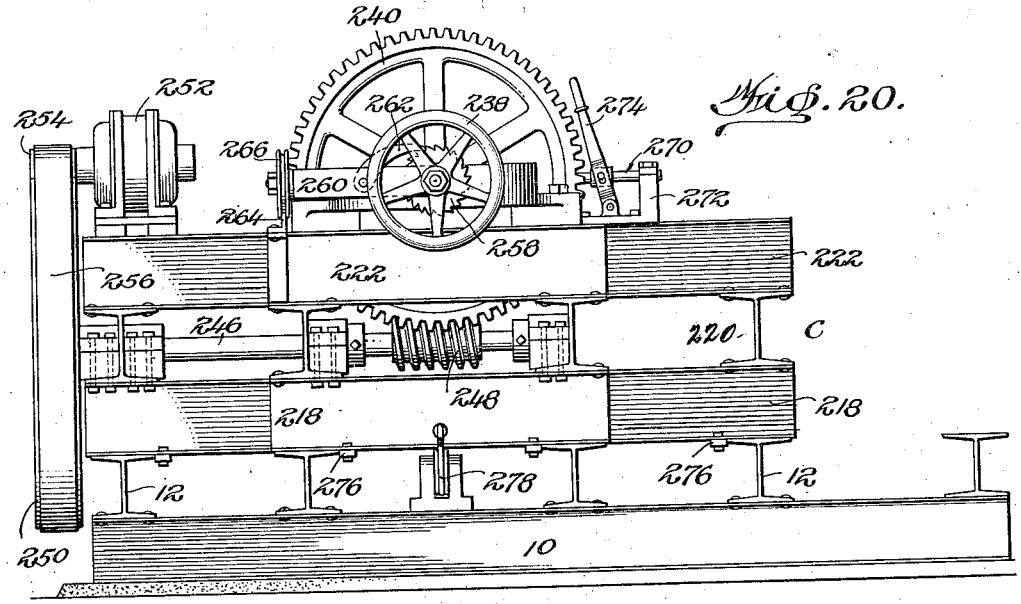

April 22, 1930. F. A. GREARSON ET AL 1,755,873
STONE WORKING MACHINE
Filed April 27, 1928 9 Sheets-Sheet 1
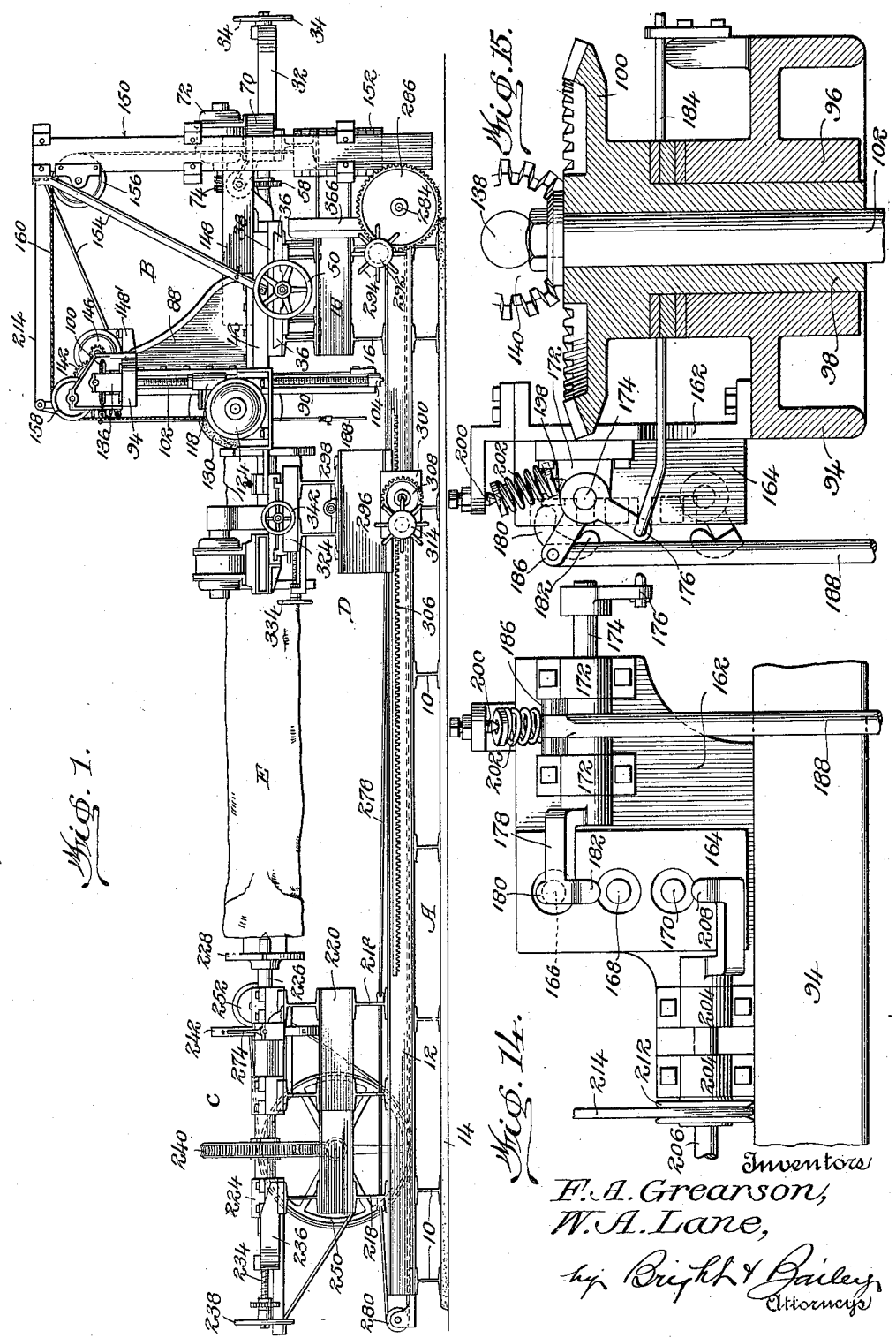

April 22, 1930. F. A. GREARSON ET AL 1,755,873
STONE WORKING MACHINE
Filed April 27, 1928 9 Sheets-Sheet 2
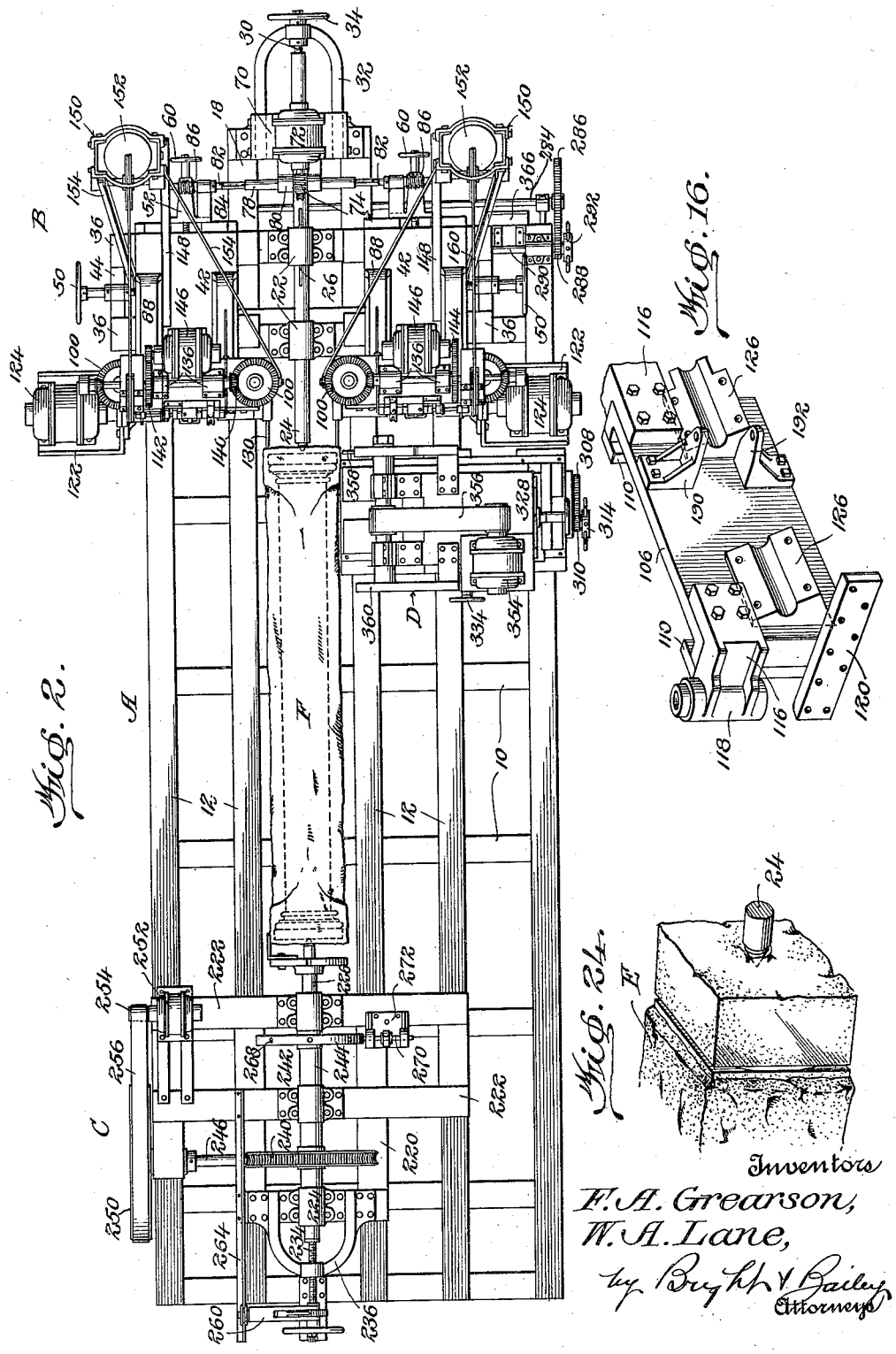

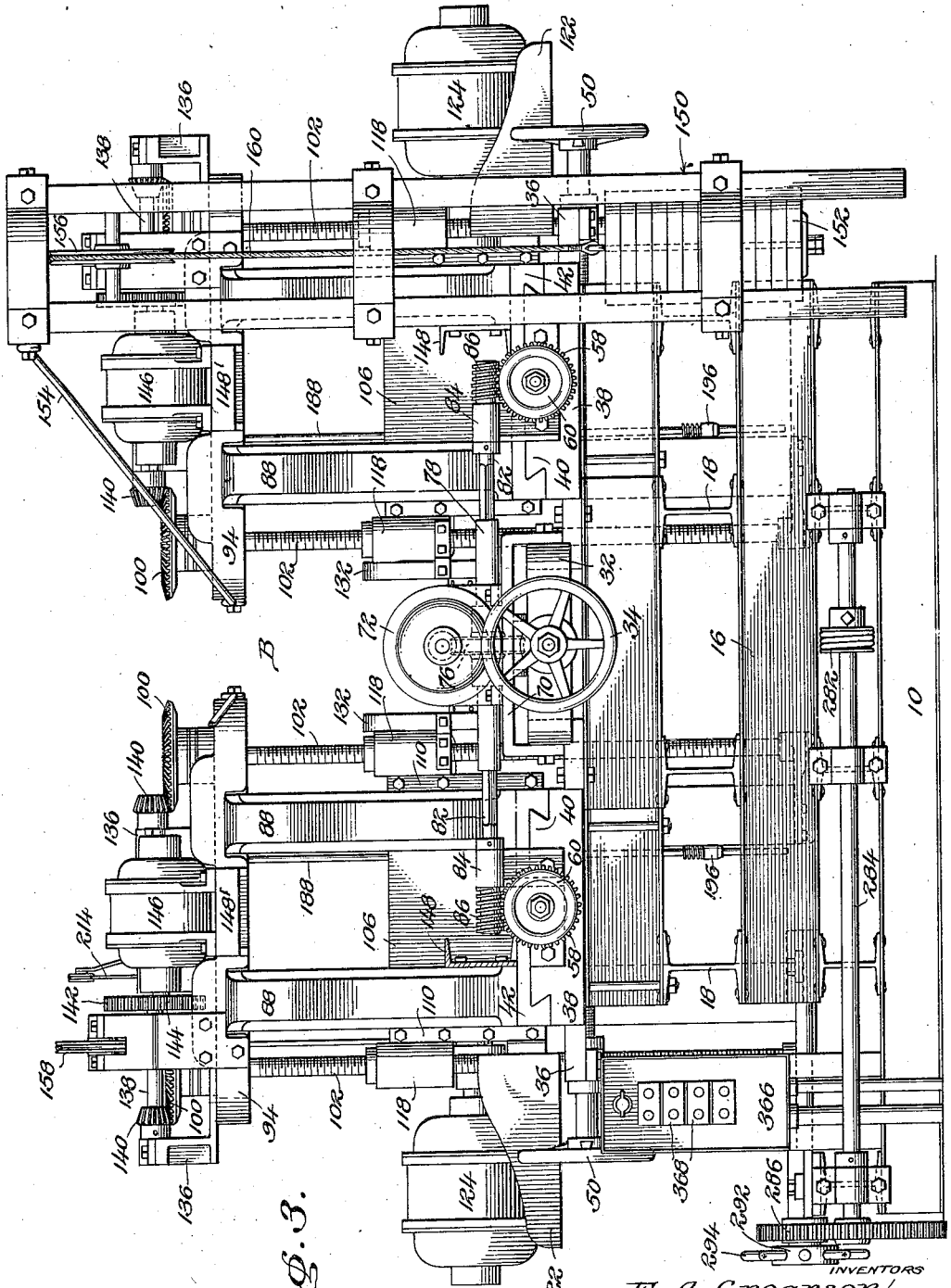

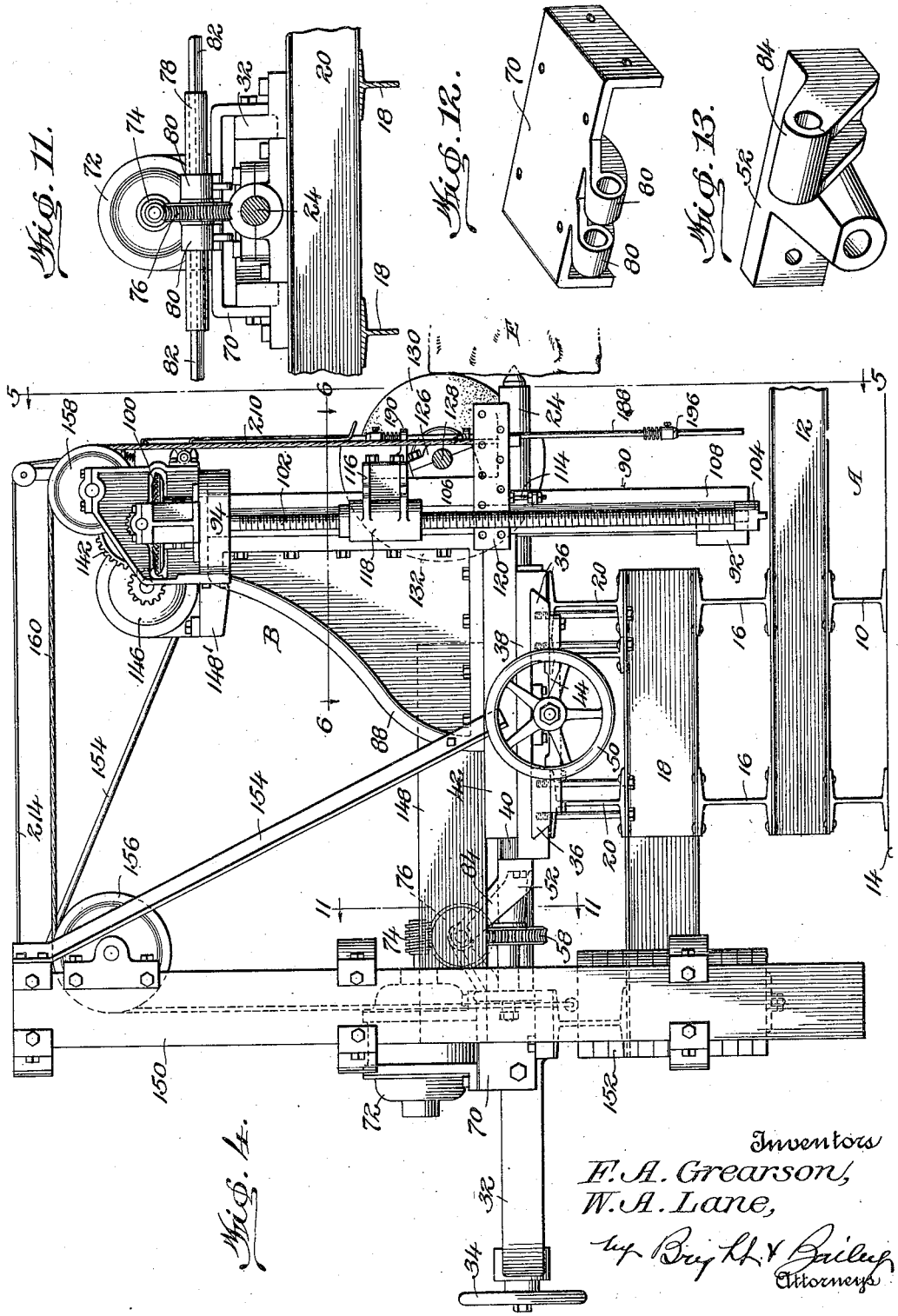

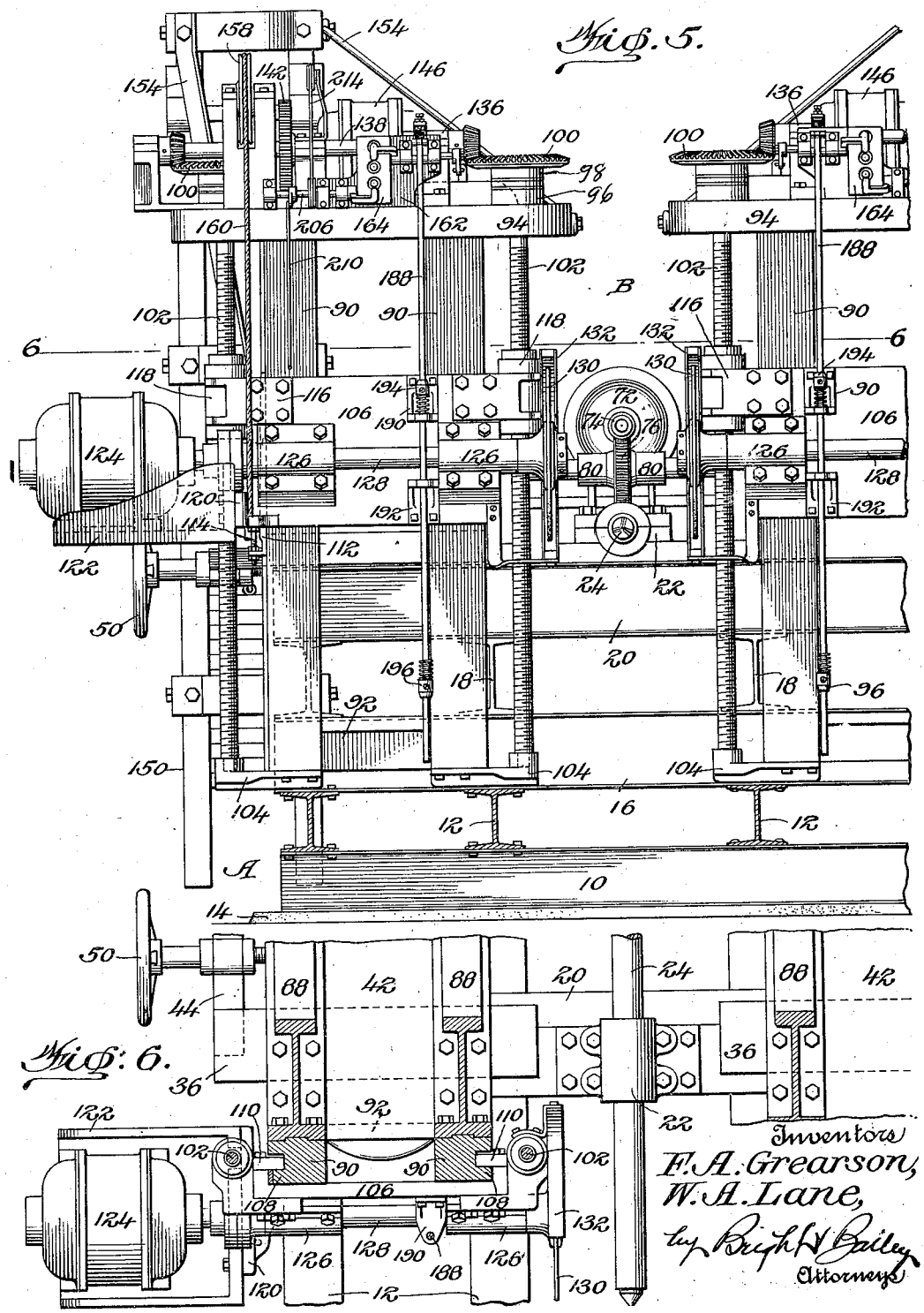

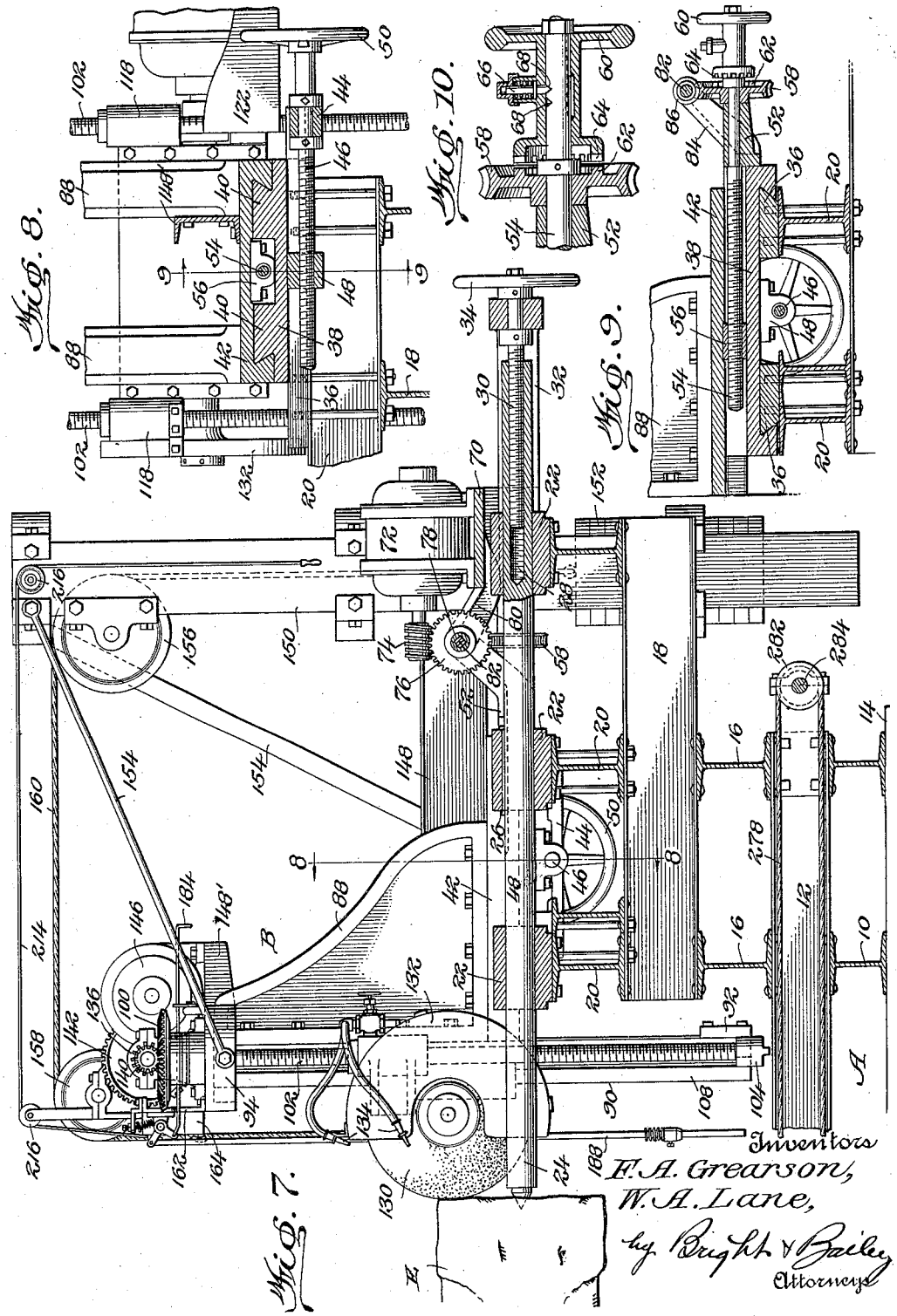

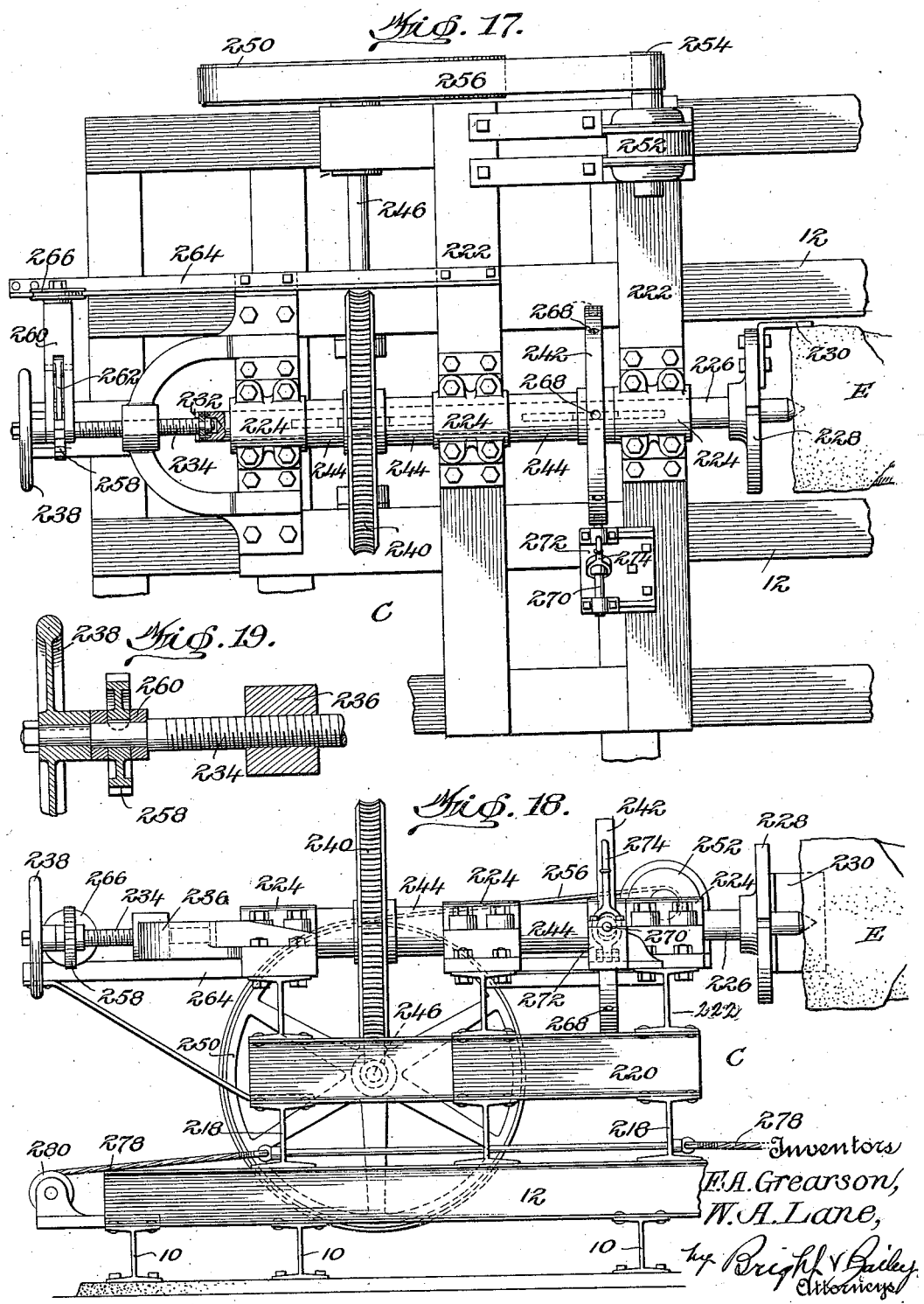

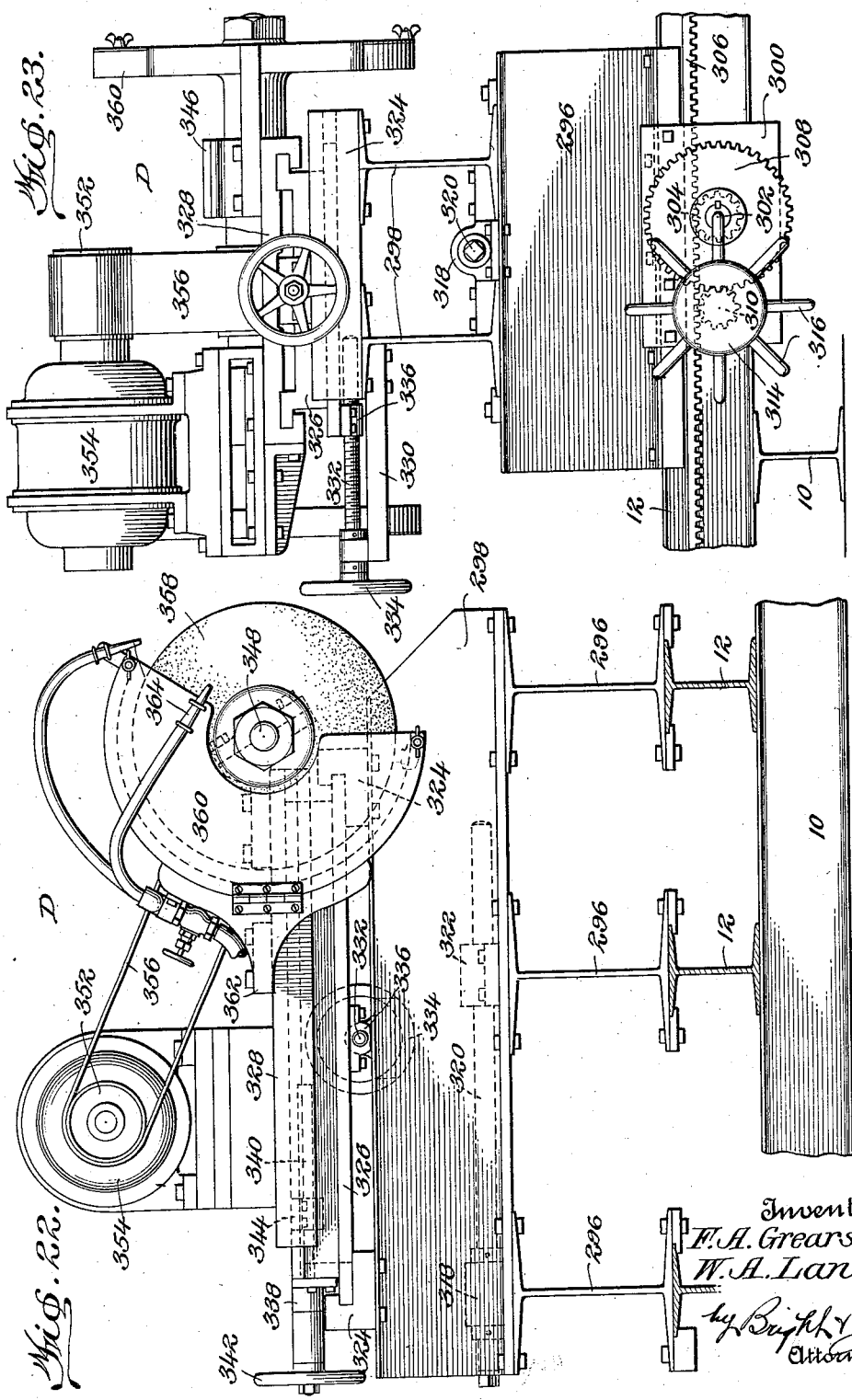

Patented Apr. 22, 1930

1,755,873

UNITED STATES PATENT OFFICE

FREDERICK A. GREARSON AND WILLIS A. LANE, OF BARRE, VERMONT

STONE-WORKING MACHINE

Application filed April 27, 1928. Serial No. 273,292.

In producing from stone various objects such as columns, urns, vases and the like having in their length flat side surfaces providing square or other polygonally-shaped formations such as caps, bases and the like, it is the usual practice first to cut the sides of the rough block of stone from which a particular object is to be produced to form such side surfaces, then to perform whatever other operations may be required to reduce the block to the shape desired, and, finally, to cut off the ends of the block, this last operation not being performed as a rule until all other operations have been completed in order that the stone at the ends of the block may be utilized as long as possible as a means of protecting the finished parts of the object against breakage and chipping. Heretofore, to the best of our knowledge and belief, the operations of cutting flat side surfaces on a block and the cutting off of the ends of the block have been accomplished manually by skilled workmen at relatively great expense, but despite the greatest skill and the utmost care utilized in the performance of such operations, the percentage of objects ruined by chipping and breakage as a direct result of such operations is extremely high. Accordingly it is our purpose to provide a machine which eliminates the necessity of employing skilled workmen to perform the operations mentioned and which as a consequence reduces to a minimum the cost of performing such operations, which is thoroughly reliable, efficient, rapid and accurate in its operation, and by the use of which liability of breakage of objects as a result of the performance of the operations mentioned is reduced to a minimum.

With the foregoing and other purposes in view, our invention consists in the various novel features of construction, combination and arrangement of parts as will be hereinafter more fully described, illustrated in the accompanying drawings and defined in the appended claims.

In the drawings, wherein like characters of reference denote corresponding parts in the different views:—

Figure 21:
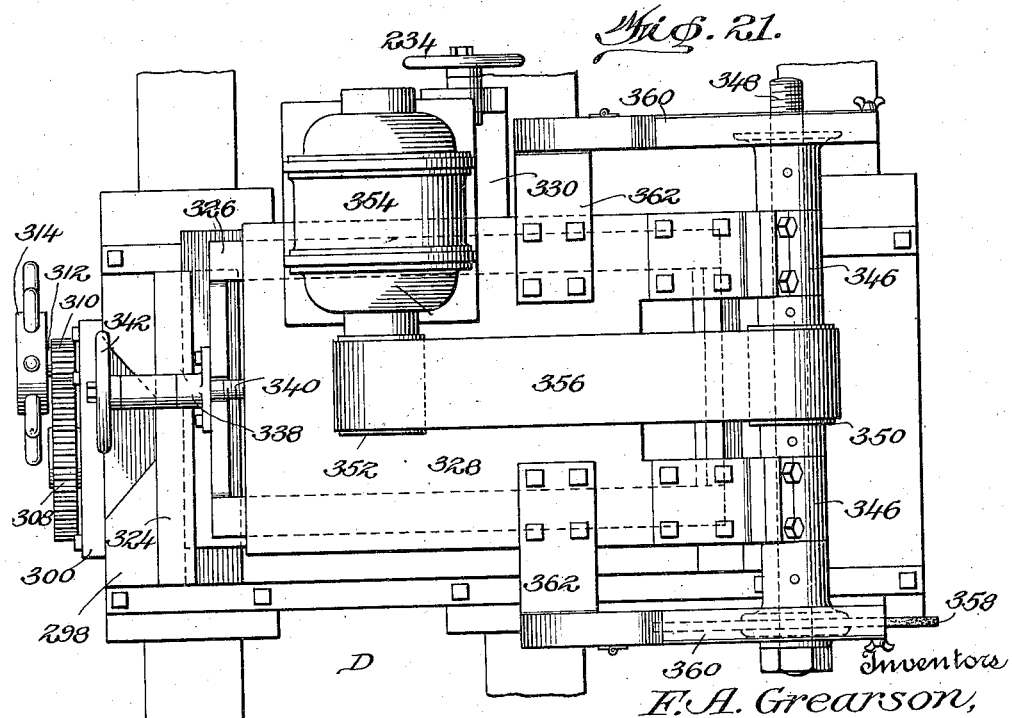

Fig. 1 is a side elevation of a machine constructed in accordance with our invention;

Fig. 2, a top plan view;

Fig. 3, an elevation, partly in section, on an enlarged scale, looking towards the head stock end of our machine;

Fig. 4, an enlarged side elevation, partly in section, of the head stock end of our machine;

Fig. 5, a section on the line 5—5 of Fig. 4;

Fig. 6, a section on the line 6—6 of Fig. 5;

Fig. 7, a central longitudinal section through the head stock end of our machine;

Fig. 8, a section on the line 8—8 of Fig. 7;

Fig. 9, a section on the line 9—9 of Fig. 8;

Fig. 10, a detail section through the clutch mechanism shown in Fig. 9;

Fig. 11, a section on the line 11—11 of Fig. 4;

Fig. 12, a perspective view of a motor supporting bracket used in our machine;

Fig. 13, a perspective view of a shaft supporting bracket used in our machine;

Fig. 14, an enlarged elevation of an automatic motor control switch operating mechanism used in our machine;

Fig. 15, an end view, partly in section of the mechanism shown in Fig. 14;

Fig. 16, a perspective view of one of the reciprocal cutter wheel carriers of our machine;

Fig. 17, a top plan view on an enlarged scale of the tail stock end of our machine;

Fig. 18, an enlarged side elevation of the tail stock end of our machine;

Fig. 19, a detail section through an adjusting screw embodied in the tail stock of our machine;

Fig. 20, an elevation looking towards the tail stock end of our machine;

Fig. 21, a top plan view on an enlarged scale of a tool carriage forming part of our machine;

Fig. 22, a side elevation of the tool carriage shown in Fig. 21;

Fig. 23, a front elevation of the tool carriage shown in Figs. 21 and 22; and

Fig. 24, a perspective view illustrating the work performed by our machine.

Referring now to the drawings in detail, it will be observed that our machine includes essentially a bed A which may be of any suitable or desired construction, consisting, for example, as shown, of a plurality of I-beams 10 arranged in spaced, parallel relation transversely of the machine and a plurality of I-beams 12 arranged in spaced, parallel relation longitudinally of the machine, the beams 12 being riveted, bolted or otherwise rigidly mounted on the beams 10 and the latter being adapted for anchorage to a suitable foundation such as a base of concrete or the like as illustrated at 14.

Mounted on the bed A at one end thereof is what we term a head-stock B, while also mounted on said bed for adjustment longitudinally therealong is a tail-stock C and a tool carrier D.

At the head stock end of the machine, according to the herein illustrated structure which may be varied in many respects as will become more fully apparent hereinafter, a frame is built up upon the bed A to support the head-stock mechanism, said frame consisting of a plurality of I-beams 16 extending transversely across and secured rigidly by means of rivets, bolts or the like to the I-beams 12, a plurality of I-beams 18 extending longitudinally of the machine across and secured rigidly to the I-beams 16, and a plurality of I-beams 20 extending transversely of the machine across and secured rigidly to the I-beams 18.

Bearings 22 are mounted on the upper faces of the I-beams 20 at or substantially at the longitudinal center of the machine as viewed in top plan and in these bearings is mounted a longitudinally slidable shaft 24, suitably splined as indicated at 26 whereby it is held against rotation. At its rear end this shaft is provided with a threaded bore 28 in which is threaded a rod 30 journaled for rotation, but held in any suitable manner against longitudinal movement in a bearing carried by a bracket 32 fixed to the rearmost I-beam 20, a hand-wheel 34 being fixed to said rod for rotating same whereby, as is apparent, longitudinal adjustments of the shaft 24 may be effected. Shaft 24 is adapted to rotatably support one end of a block of stone E to be cut as aforementioned and to this end said shaft is provided with a cone-shaped forward end for engagement in a depression formed in an end of the block to hold the latter centered in a manner which is well known.

At each side of the shaft 24 the I-beams 20 have rigidly secured upon their upper faces a pair of guide bars 36, 36, arranged in parallel, spaced relation transversely of the machine, and slidably mounted on each pair of said bars for adjustment transversely of the machine is a plate 38. Each plate 38 in turn has formed on its upper face a pair of guide ribs 40 and on each pair of these ribs is slidably mounted for adjustment longitudinally of the machine a second plate 42. The bars 36 of each pair are connected at their outer ends by a bracket 44, each bracket having a bearing in which is journaled for rotary, non-longitudinal movement a threaded rod 46. Each rod has threaded connection with a boss or nut 48 on the under side of and rigid with its related plate 38, and in addition each rod is equipped with a hand-wheel 50 for effecting its rotation, the result of rotation of either hand-wheel being to adjust its related plate 38, and whatever mechanism is carried thereby, transversely of the machine as is obvious.

Secured to the rear end of each plate 38 is a bearing bracket 52 and in each of said brackets is journaled for rotary, non-longitudinal movement a threaded rod 54 having threaded connection with a boss or nut 56 on the under side of and rigid with its related plate 42, so that by rotating said rods 54 the plates 42 may be adjusted relatively to the plates 38 in directions longitudinally of the machine. Loosely mounted on each rod 54 so as to be freely rotatable with respect thereto is a worm wheel 58, while splined to each of said rods for longitudinal sliding movement, non-rotation with respect thereto is a hand wheel 60. Clutch formations such as teeth 62, 64 are provided, respectively, on the worm wheels 58 and the hand wheels 60 so that by shifting the hand wheels along the rods 54 to engage their clutch formations with the clutch formations of the worm wheels the latter will be locked to said rods and the latter compelled to rotate with said worm wheels, and by shifting said hand wheels to disengage said clutch formations rotation of the worm wheels will be ineffective to rotate said rods, although the latter may under such conditions be rotated by the hand wheels due to their splined connections therewith. A spring pressed pin 66 carried by each hand wheel 60 is adapted for engagement in either of a pair of spaced notches 68, 68 formed in each rod 54 to hold said hand wheels either in clutch engaged or clutch disengaged positions.

A motor supporting bracket 70 of inverted U-shape is secured to the bracket 32 or to another suitable part of the head-stock frame and has mounted thereon a reversible electric motor 72 the drive shaft of which is equipped with a worm 74 which meshes with a worm wheel 76 fixed to a transverse shaft 78 journaled for rotation in a pair of bearing carrying arms 80 projecting from the bracket 70. A pair of shafts 82, 82 journaled for rotation in bearing carrying arms 84 projecting from the brackets 52, 52, respectively, have splined, telescoping connection at their inner ends with the shaft 78 and have fixed thereto, respectively, worms 86, 86 in mesh with the worm wheels 58, 58, respectively, the result being that if the clutch formations of the worm and hand wheels 58, 60 are engaged, rotation of the motor 70 will operate through the gearing just described to rotate the threaded rods 54 and adjust the plates 42 either forwardly or rearwardly as may be desired. On the other hand if the said clutch formations are disengaged, rotation of the motor will serve merely to rotate the worm wheels 58 idly on the rods 54 and the latter may then be rotated manually by means of the hand wheels 60.

By the provision of the splined telescoping connection between the shafts 78, 82, 82 it is apparent that adjustments of the plates 38, 42 transversely of the machine by the hand wheels 60 is permitted without destroying the drive train between the motor 72 and the rods 54, so that in any position of adjustment of said plates transversely of the machine the motor 72 is effective, if the aforementioned clutch formations are engaged, to adjust the plates 42 longitudinally of the machine.

The plates 42, 42 carry duplicate mechanisms, except that they are reversed with respect to one another, so that corresponding portions of each will be disposed in the same relation to opposite sides of a block of stone E to be cut. A description of one of said mechanisms therefore will suffice for both:—
Bolted or otherwise rigidly secured to and rising from the upper face of plate 42 is a pair of brackets 88, 88 which serve as a means of rigidly connecting with said plate a pair of vertically disposed transversely spaced guide bars 90, 90. Said guide bars extend across the front faces of the plates 38, 42 downwardly into close proximity to the bed beams 12 where they are connected together by a transverse strengthening bar 92. They also extend upwardly a considerable distance above said plates and at their upper ends are rigidly connected together by a casting 94 the ends of which extend transversely of the machine beyond said guide bars. A bearing 96 is formed in each end of the casting 94 and in each of said bearings is journaled for rotation the hub portion 98 of a bevel gear 100. Each gear carries rigidly therewith a threaded shaft 102 and, as shown, said shafts extend downwardly in parallelism to the outer faces of the guide bars 90, 90, respectively, and at their lower ends are journaled for rotation in bracket arms 104 carried by the lower end of said guide bars. Shoulders on the hubs of the gears 100 engaging the bearings 96 serve to prevent downward movement of the shafts 102, while the weight of the mechanism carried by said shafts serves to prevent them from moving upward.

Mounted for vertical sliding movement along the front faces of the guide bars 90, 90 is a plate 106, the sliding connection between this plate and said guide bars being effected in any suitable manner, for example, by channeling the outer faces of the guide bars to form flanges 108 therealong and attaching to rearwardly extending, guide bar overlying end portions of said plates, flange members 110 which extend into said grooves and slidably engage the rear faces of said flanges 108, thereby slidably interlocking the plate 106 with said guide bars.

To take up any wear which may occur between the flanges 108 and the end portions of the plate 106 which overlie same a wedge shaped shim 112 is disposed between the outer edge of one of the flanges and the inner face of the adjacent overlying end portions of the plate 106, this shim being adjustably connected with said plate 106 as indicated generally at 114.

Secured rigidly to plate 106 at the ends thereof, respectively, is a pair of brackets 116, 116 having threaded bosses 118, 118 in threaded engagement, respectively, with the shafts 102, 102 so that, obviously, when said shafts are rotated in one direction the plate 106 is moved downwardly along the guide bars 90, 90 and when said shafts are rotated in an opposite direction said plate is moved upwardly along said guide bars.

Formed on or rigidly secured to the outer end of the plate 106 is a horizontally disposed arm 120 to which is fixed a platform member 122 constituting a support for an electric motor 124. Bearings 126 are carried by the front face of the plate 106 and have journaled therein a horizontal, transversely extending shaft 128 the inner end of which detachably carries a suitable cutting tool such as a carborundum wheel 130 and the outer end of which is coupled to said motor whereby the latter is effective to drive said wheel.

A shield in the form of a housing 132 carried by the plate 106 and the inner bracket 116 covers all but a forward cutting portion of the wheel 130, and mounted on said shield, as shown in Fig. 7, but not shown in the other views in order to avoid confusion, is a plurality of water spray nozzles 134 arranged to direct streams of water on the cutting portion of said wheel when it is in operation.

Mounted on the upper face of the casting 94 is a plurality of bearings 136 supporting for rotation a horizontally disposed shaft 138 which extends transversely of the machine and has fixed thereto a pair of bevel pinions 140, 140 disposed in mesh, respectively, with the bevel gears 100, 100. Also fixed to this shaft is a spur gear 142 with which meshes a spur pinion 144 fixed to the shaft of a reversible electric motor 146 mounted on a rearward extension 148 of said casting 94. Thus it is apparent that by operating the motor 146 in one direction rotation of the threaded shafts 102 will be effected through the gearing just described to elevate the plate 106 and the parts carried thereby, and operation of said motor in the opposite direction will serve to lower said plate and the parts carried thereby.

The weight of the plate 106 and the parts carried thereby is considerable and in order to relieve the guide bars 90, 90 and the shafts 102, 102 of this weight a counter-balance mechanism is provided. A beam 148' is secured to the plate 42 and extends rearwardly therefrom, carrying at its rear end a vertically disposed guide structure 150 for a weight 152, said guide structure being maintained rigid with respect to the plate 42 by means of brace rods 154 connecting said structure with said plate and the casting 94. Sheaves 156, 158 are mounted on the structure 150 and the casting 94, respectively, and have trained thereover a cable 160, one end of which is attached to the plate 106 and the other end of which is attached to the weight 152.

Mounted on a bracket 162 secured to the upper face of the casting 94 is a switch box 164 carrying three switches operable by buttons 166, 168 and 170 for the control of the motor 146. The switches referred to and the circuits to said motor may be of any suitable or preferred type, but since they do not form in themselves any part of the present invention they have not been illustrated in detail. Suffice it is to say that depression of the button 166 serves to produce operation of the motor in a direction to feed the plate 106 downward, depression of the button 168 serves to produce operation of the motor in a direction to feed the plate 106 upwardly, and depression of the button 170 serves to stop the motor, this last mentioned button merely being in control of an emergency stop switch.

To one side of the switch box 164 the bracket 162 carries a pair of bearings 172 having journaled therein for oscillatory movement a short horizontally disposed shaft 174, carrying at its outer end a lever arm 176 and at its inner end an arm 178 terminating in a pair of push button engaging fingers 180, 182 arranged for cooperation, respectively, with the push buttons 168, 170. The fingers 180, 182 are so arranged that if the shaft 174 is rotated through a small angle in one direction the finger 180 will be caused to engage and depress the button 166 and if it is rotated through a small angle in the opposite direction the button 166 will be released and the finger 182 caused to depress the button 168. A rod 184 is connected with the lever arm 176 and extends rearwardly across the casting 94 to a suitable convenient position for manual manipulation to operate the switch buttons 166, 168. In addition, an arm 186 mounted rigidly on shaft 174 and extending forwardly therefrom, has pivotally connected therewith the upper end of a push rod 188 which extends downwardly loosely through a pair of brackets 190, 192 fixed to the plate 106 and terminates near the lower ends of the guide bars 90. Stops 194, 196 are arranged on said push rod for engagement, respectively, by the brackets 190, 192, the result being, assuming the fingers 180, 182 to be in the position of Fig. 15 and the plate 106 to be moving downward, that when the bracket 192 engages the stop 196 the rod 188 will be forced downward thereby rotating the shaft 174 to release the push button 166 and depress the push button 168, thereby causing the motor 146 to be reversed with consequent reversal in the direction of movement of the plate 106. Upon upward movement of the plate the stop 194 will be engaged by the bracket 190 and the rod 188 will be lifted with the result that the shaft 174 will be rotated to release the push button 168 and depress the push button 166, thereby reversing the motor 146 and causing the plate 106 to again be moved downward. The stops 194, 196 are adjustable along the rod 188 so that, as is apparent, the plate 106 may be caused to automatically reciprocate vertically along the guide bars 90 within any limits desired simply by placing the stops in desired positions of adjustment along the rod.

Fixed with respect to and extending radially from the shaft 174, being carried, for example, by the arm 186, is a pin 198, while mounted in a suitable support directly over the shaft 174 is another pin 200. A coil spring 202 being arranged between said pins and operating in obvious manner through the shaft 174 to hold the fingers 180, 182 against movement during travel of the brackets 190, 192 between the stops 194, 196.

To the side of the switch box 164 opposite the side thereof to which the motor reversing mechanism just described is located the bracket 162 has mounted thereon in bearings 204 a horizontally disposed shaft 206 carrying a finger 208 for depressing the switch button 170, said shaft having a rod 210 attached to and extending downwardly therefrom across the front of the head stock for manual manipulation at that point in case of emergency to stop the motor 146, and also having attached thereto a wheel 212 to which is secured one end of a cord 214 leading over suitable sheaves 216 to an appropriate position at the rear of the machine whereby the motor 146 may be stopped from that point simply by pulling said cord to rotate the wheel 212 and thus rotate the shaft 206 to swing the finger 208 into engagement with the button 170.

Although the mechanisms carried by the respective plates 42 are connected together for collective adjustment longitudinally of the machine by the motor 72, it is manifest that each mechanism is capable of any permissible adjustment thereof independently of the other, so that while one wheel 130 is making a certain cut on one side of a block of stone E supported by the shaft 24, the other wheel 130 may be making a cut of the same type, but at a different distance from the axis and end of the block on the other side thereof. It is also apparent that, if desired, one of the mechanisms may be removed from the machine in its entirety without affecting the operativeness of the other mechanism, which is of importance in that the machine may be built and distributed in units capable of being readily assembled into the complete machine shown, and because, in the case of a two cutting unit head stock machine, if either unit is damaged the other unit may be continued in operation during the time the damaged unit is being repaired.

The tail stock C, illustrated in detail in Figures 17 to 20 of the drawings, embodies a frame consisting of a plurality of I-beams 218 arranged transversely across and adapted to slide longitudinally along the beams 12 of the bed A, a plurality of I-beams 220 arranged longitudinally of the machine across and rigidly connected with the I-beams 218 by means of rivets, bolts or the like, and a plurality of I-beams 222 arranged transversely across and rigidly connected with the I-beams 220. Bearings 224 are mounted on the tops of some or all of the I-beams 222 and in said bearings is journaled a shaft 226 which extends longitudinally of the machine in axial alinement with the shaft 24 of the head stock and is adapted for both rotary and longitudinal movements. The inner end of this shaft is formed of pointed cone-shape for cooperation with the inner end of shaft 24 to support a block of stone E in position for operation thereon by the machine, while in addition a face plate 228 is fixed to said shaft 226 at its inner end to carry a dog 230 for engagement with a block of stone supported between said shafts whereby rotation of shaft 226 is effective to rotate the block.

At its outer end shaft 226 has a swivel connection as indicated at 232 with the inner end of a threaded rod 234 which has threaded connection with a bracket 236 fixed to one of the I-beams 222, said rod being equipped at its outer end with a hand wheel 238 adapted for manual manipulation to rotate said rod thus to shift the shaft 226 longitudinally in a manner which is obvious.

Fitted loosely on the shaft 226 so that the latter is slidable therethrough is a worm wheel 240 and a spacing wheel 242, said wheels, however, being splined to said shaft so that they are always rotatable therewith, collars 244 loose on said shaft and located between the bearings 224 and said wheels serving to hold said wheels against longitudinal movement.

A transversely extending shaft 246 journaled in suitable bearings carried by the tail stock frame below the worm wheel 240 has fixed thereto a worm 248 in mesh with said worm wheel and at its rear end carries a relatively large pulley 250. A reversible motor 252 is mounted on the tail stock frame and is equipped with a pulley 254 connected with the pulley 250 by a belt 256. Thus, as is apparent, irrespective of the longitudinal adjustment of the shaft 226, the motor 252 is always available to rotate said shaft and the block of stone supported thereby in either direction.

Certain operations on the block E require rotation of the block as effected by the motor 252, and since rotation of the shaft 226 might have a tendency to rotate the rod 234 with consequent longitudinal movement of the shaft 226 to such an extent as to withdraw the latter from proper supporting engagement with the end of the block, means has been provided to prevent rotation of the rod 234 by the shaft 226. A toothed wheel 258 is fixed to the rod 234 and an arm 260 is mounted at its inner end loosely thereon, said arm carrying a pawl 262 cooperating with the teeth of said wheel. A track rail 264 is mounted on the tail stock frame parallel to said rod 234 and a roller 266 is provided on said arm to traverse said track rail. Inasmuch as the operative direction of rotation of the shaft 226 is always counterclockwise as viewed in Fig. 20, it thus is apparent that rotation of the rod 234 under the influence of rotation of said shaft is effectively prevented. The track rail 264 provides for maintaining the operativeness of the pawl and ratchet mechanism irrespective of the longitudinal adjustment of the rod 234, and as is apparent, should it be desired to prevent rotation of said rod by rotation of said shaft in either direction, this might readily be effected simply by adding another roller to the arm 260 for engagement with the bottom of the track rail, or providing another track rail above the roller 266 and forming spur teeth on the wheel 258 and the pawl 262.

Formed in the periphery of the spacing wheel 242 at evenly spaced intervals therearound is a plurality of holes 268 adapted to have selectively engaged therein a pin 270 slidably mounted in a bracket 272 mounted rigidly on one of the I-beams 222, a handle 274 in operative connection with said pin providing means for its manipulation. By this arrangement the block E is adapted to be rotated through predetermined angles and locked in any angular adjustment thereof desired within the range determined by the number of holes 268 provided in the wheel 242.

Strips 276 secured to the under faces of the I-beams 218 and engaging the sides of the bed beams 12 serve to prevent all except longitudinal movements of the tail-stock relative to the bed, while a cable 278 attached at its ends to the tail stock, trained over a sheave 280 secured to one end of the bed and wrapped around a drum 282 mounted on a shaft 284 journaled for rotation in bearings at the other end of the bed, serves as a means for sliding said tail stock along the bed by rotation of said shaft 284.

A spur wheel 286 is fixed to one end of the shaft 284 and has meshing therewith a spur pinion 288 fast to a stub shaft 290 journaled in suitable bearings on the bed, said shaft 290 also having fast thereto a disk 292 provided with a number of radial pins 294 for engagement by a socketed lever of any suitable type to effect rotation of the gears 286, 288, thus to effect rotation of the shaft 284 and drum 282 to shift the tail stock longitudinally of the bed.

The tool carrier D, illustrated in detail in Figs. 21 to 23 of the drawings, embodies a frame consisting of a plurality of longitudinally extending I-beams 296, mounted to one side of the longitudinal center of the machine upon the bed beams 12 for longitudinal sliding movement therealong, and a plurality of transversely extending I-beams 298 mounted on the beams 296 for sliding movement with respect thereto transversely of the machine.

Secured rigidly to the outermost I-beams 296 in overlying relation to the outer face of the outermost bed beam 12 is a plate 300 having journaled therein a shaft 302 carrying at its inner end a spur pinion 304 in mesh with the teeth of a rack bar 306 secured to and extending longitudinally along the outer face of the said outermost bed beam 12. On the outer end of said shaft is fixed a spur gear 308 which meshes with a spur pinion 310 on a stub shaft 312 also journaled in said plate 300. In addition said stub shaft has fixed thereto a disk 314 carrying a plurality of radial pins 316 for engagement by a socketed lever to effect rotation of the gears 310, 318 and 304 whereby the cooperation of gear 304 with the rack bar 306 may be caused to produce longitudinal movement of the tool carrier as an entirety along the bed.

Fixed to the upper face of the outermost I-beam 296 is a bearing 318 in which is mounted for rotary, non-longitudinal movement a threaded rod 320, equipped at its outer end with any suitable means for effecting its rotation and at its inner end having threaded engagement with a nut 322 secured to one or more of the beams 298, the result being, as is apparent, that by rotation of said rod the beams 298 and whatever mechanism is carried thereby will be moved with respect to the beams 296 transversely of the machine.

Extending across and rigidly connecting the beams 298 adjacent to their ends is a pair of guide bars 324, 324, respectively, between and upon which is mounted for sliding movement longitudinally of the machine a plate 326 which in turn has mounted thereon for sliding movement transversely of the machine a plate 328. A bracket 330 is secured to one of the beams 298 and has journaled therein for rotary, non-longitudinal movement a threaded rod 332 equipped at its outer end with a hand wheel 334 for effecting its rotation and at its inner end which underlies the plate 326 having threaded connection with a boss or nut 336 rigid with said plate, whereby rotation of said rod is effective to produce sliding movement of said plate longitudinally of the machine along the guide bars 324 as is manifest.

Fixed to the outer end of the plate 326 is a bracket 338 having journaled therein for rotary, non-longitudinal movement a threaded rod 340 equipped at its outer end with a hand wheel 342 and at its inner end which underlies the plate 328 having threaded engagement with a boss or nut 344 rigid with said plate, the result being, as is manifest, that rotation of the rod 340 is effective to adjust the plate 328 with respect to the plate 326 transversely of the machine.

Secured to the plate 328 at its inner end is a plurality of bearings 346 having journaled therein a shaft 348 which extends longitudinally of the machine and has fixed thereto a pulley 350 in alinement with a pulley 352 on the shaft of an electric motor 354 also mounted on said plate, a belt 356 being trained over said pulleys whereby rotation of the motor produces rotation of said shaft.

Either end of the shaft 348 is adapted to have detachably mounted thereon a carborundum cutting wheel 358, both ends of said shaft being constructed to receive such wheel to minimize necessary adjustments of the tool carrier longitudinally of the machine and to enable said wheel to be positioned in cutting relation with the block of stone E any where along its length.

Shields 360 mounted on brackets 362 carried by the plate 328 are adapted to house the wheel 358 in either position thereof, and nozzles 364, shown in Fig. 22, but not shown in the other figures in order to avoid confusion, are mounted on said shields in position to direct streams of water on the cutting portion of said wheel.

Located at any convenient point either on or adjacent to the machine is a switch box 366 having switches 368 therein in control of the various motors embodied in the machine.

In view of the foregoing it is believed the operation of our machine will be apparent. If, for example, it is desired to produce a column having a rectangular cap and a rectangular base, a roughly hewn block of stone E which has been provided with center depressions in its ends to receive the ends of the shafts 24, 226 of the head and tail stocks, respectively, is positioned by a crane or other suitable apparatus between said shafts and the hand wheels 34, 238 manipulated to bring the ends of said shafts into said depressions, whereupon the block is supported in position for operation thereon either by the cutting wheels 130 or the wheel 358. The first operation is to cut flat surfaces on two opposite faces of the block at one end thereof, and accordingly the block is rotated by means of the tail stock motor 252 until it is brought rotatably into proper relation to the wheels 130, whereupon the pin 270 is projected into one of the holes 268 to hold it against rotation from such position. By means of the hand wheels 50 and the motor 72 the cutting wheels 130 then are adjusted transversely and longitudinally of the machine to desired cutting positions with respect to opposite sides of the block. The motors 124 then are set into operation to produce rotation of the cutting wheels and, following adjustment of the stops 194, 196 to give the desired amount of vertical travel to said cutting wheels, the motor 146 is started. The result is that the wheels 130 while rotating will be reciprocated vertically with respect to the block E. Feeding of the wheels 130 into the block may be effected by the motor 72 or by the hand wheels 60 as previously explained, it being contemplated in respect to this feature of our invention that the motor 72 shall be used merely to move the wheels 130 quickly to and from an operative position and that the hand wheels 60 shall be used for actually feeding said wheels into the block. When flat surfaces have been cut on two opposite faces of the block the cutting wheels 130 are moved rearwardly away from block, the pin 270 is withdrawn and the block then rotated 90° to bring its other two sides into position to be cut by the wheels 130, whereupon the pin 270 is projected into another hole in the wheel 242 to hold the block against rotation and the operation just recounted is repeated. The result will be a block with a rectangular end as shown in Fig. 24 of the drawings. If now circular cuts are to be made in the block, to form or to initiate formation of the mouldings shown in dotted lines in Fig. 2 of the drawings, the tool carrier D is moved to a proper position along the bed and by means of the hand wheels 334, 342, the cutting wheel 358 is brought into operative relation with the block. The pin 270 is withdrawn and the motor 252 started to rotate the block, and the motor 354 is started to rotate the wheel 358, feeding of said wheel into the rotating block being accomplished by the hand wheel 342. When the cutting operations at one end of the block have been completed it is reversed and the necessary cutting operations at the other end thereof effected. The block then is removed from our present machine and placed in a lathe or other machine to complete the column with the exception of cutting off the rough ends thereof which is accomplished when the column is returned to our present machine by the wheel 358 in the same manner that said wheel is employed to cut mouldings or other formations in the block.

From the foregoing description considered in connection with the accompanying drawings it is believed that the construction, operation and advantages of our machine will be clearly understood. We desire to point out, however, that various changes and desirable additions may be made in and to the structure shown within the spirit and scope of our invention as defined in the appended claims.

We claim:—

1. A machine of the character described comprising a bed, a head stock and a tail stock mounted on said bed, means for supporting a piece of material to be operated on by and between said stocks, and tools mounted on said head stock and said bed, respectively, for operation on a piece of material supported between said stocks, the tool on said head stock being reciprocal in a direction transverse with respect to the longitudinal axis of the machine.

2. A machine of the character described comprising a bed, a head stock and a tail stock mounted on said bed, means for supporting a piece of material to be operated on between said stocks, a tool for operation on a piece of material supported between said stocks, at least one of said stocks being movable along said bed towards and away from the other whereby pieces of material of different lengths may be accommodated between said stocks, and means at one end of said bed connected with the stock located at the greatest distance from that end of the bed for moving such stock towards and away from the other stock.

3. A machine of the character described comprising a bed, a head stock and a tail stock mounted on said bed, means for supporting a piece of material to be operated on between said stocks, a tool for operation on a piece of material supported between said stocks, at least one of said stocks being movable along said bed towards and away from the other whereby pieces of material of different length may be accommodated between said stocks, a drum at one end of said bed, a sheave at the other end thereof, a flexible element trained over said sheave and around said drum and connected at its ends with one of said stocks, and means for rotating said drum thereby to move the stock with which said flexible element is connected towards and away from the other stock.

4. A machine of the character described comprising a bed, a head stock and a tail stock mounted on said bed, means for supporting a piece of material to be operated on between said stocks, a tool mounted on said head stock for operation on a piece of material supported immovably between said stocks, a tool mounted on said bed for operation on a rotating piece of material supported between said stocks, means carried by said tail stock for rotating a piece of material supported between said stocks, and means also carried by said tail stock for holding a piece of material supported between said stocks against movement.

5. A machine of the character described comprising a bed, a head stock and a tail stock mounted on said bed, means for supporting a piece of material to be operated on between said stocks, a tool mounted on said bed for operation on a rotating piece of material supported between said stocks, means carried by said tail stock for rotating a piece of material supported between said stocks, means also carried by said tail stock for holding a piece of material supported between said stocks against movement, and a tool carried by said head stock movable with respect thereto towards and away from said tail stock for forming a plane surface on the side of a piece of material supported immovably between said stocks.

6. A machine of the character described comprising a bed, a head stock and a tail stock mounted on said bed, means for supporting a piece of material to be operated on between said stocks, a tool mounted on said bed for operation on a rotating piece of material supported between said stocks, means carried by said tail stock for rotating a piece of material supported between said stocks, means also carried by said tail stock for holding a piece of material supported between said stocks against movement, and a pair of tools carried by said head stock for simultaneously forming plane surfaces on opposite sides of a piece of material supported immovably between said stocks.

7. A machine of the character described comprising a bed, a head stock and a tail stock mounted on said bed, means for supporting a piece of material to be operated on between said stocks, a tool mounted on said bed for operation on a rotating piece of material supported between said stocks, means carried by said tail stock for rotating a piece of material supported between said stocks, means also carried by said tail stock for holding a piece of material supported between said stocks against movement, and a tool carried by said head stock movable with respect thereto in horizontal and vertical directions for forming a plane surface on the side of a piece of material supported immovably between said stocks.

8. A machine of the character described comprising a bed, a head stock and a tail stock mounted on said bed, means for supporting a piece of material to be operated on between said stocks, a tool mounted on said bed for operation on a rotating piece of material supported between said stocks, means carried by said tail stock for rotating a piece of material supported between said stocks, means also carried by said tail stock for holding a piece of material supported between said stocks against movement, and a tool carried by said head stock vertically movable with respect thereto for forming a plane surface on the side of a piece of material supported immovably between said stocks.

9. In a machine of the character described, a tail stock comprising a frame, a rotatable and longitudinally movable shaft carried by said frame, means at one end of said shaft for engagement with a piece of material to be operated whereby said shaft is effective to support and rotate said material, means at the other end of said shaft to adjust same longitudinally to bring its first mentioned end into engagement with a piece of material to be supported thereby, a worm wheel keyed to said shaft, means holding said worm wheel against endwise movement, a worm in mesh with said worm wheel, and a motor mounted on said frame connected with said worm for rotating same.

10. In a column cutting machine of the character described a tool carrier comprising a frame mounted for adjustment longitudinally of the machine, a plate mounted on said frame for linear adjustment with respect thereto in directions at right angles to one another, a rotary cutting wheel mounted on said plate, a motor mounted on said plate, a driving connection between said motor and said cutting wheel, and means for effecting the aforementioned adjustments of said plate.

11. In a machine of the character described, a cutting tool, means for translating said tool longitudinally of the machine to and from an operative position with respect to a piece of material to be cut, means for adjusting said tool in directions transversely of the machine, and means for automatically reciprocating said tool in directions at right angles to its directions of translation and transverse adjustment.

12. In a machine of the character described, a support mounted for vertical reciprocation and for horizontal adjustments in directions at right angles to one another, a rotary cutting tool carried by said support, a motor carried by said support connected to said cutting tool for rotating same, means for horizontally adjusting said support, and means for automatically reciprocating said support.

13. In a machine of the character described, a support mounted for vertical reciprocation and for horizontal adjustments in directions at right angles to one another, a rotary cutting tool carried by said support, a motor carried by said support connected to said cutting tool for rotating same, means for horizontally adjusting said support, means for automatically reciprocating said support, and adjustable means to predetermine the range of reciprocal movement of said support.

14. In a machine of the character described, a rotary cutting tool, means for rotating said tool, and means for automatically reciprocating said tool across a piece of material to be cut supported in operative relation to said tool, said tool having only rotary movement and reciprocal movement across the piece of work.

15. In a machine of the character described, a cutting tool mounted for translation to and from an operative position with respect to a piece of material supported in a position to be cut thereby, power and manually operable devices for translating said tool, and means operable to simultaneously disconnect one of said devices from and connect the other of said devices with said tool.

16. In a machine of the character described, a pair of cutting tools mounted for translation to and from an operative position with respect to a piece of material supported in a position to be cut thereby, means for independently translating said tools, and a power device connected with said tools effective in any position of translatory adjustment of one tool with respect to the other to translate said tools simultaneously.

17. In a machine of the character described, a cutting tool mounted for translation to and from an operative position with respect to a piece of material supported in a position to be cut thereby, a power device connected with said tool for translating same, and means included in the connection between said tool and said power device for manually translating said tool.

18. In a machine of the character described, a frame, a plate mounted on said frame for sliding adjustment across the same, a second plate mounted on said first plate for sliding adjustment with respect thereto in a direction at right angles to the direction of adjustment of said first mentioned plate, a cutting tool mounted on said second mentioned plate, and power means mounted on the frame operable in all positions of adjustment of said first mentioned plate to adjust said second mentioned plate.

19. In a machine of the character described, a frame, a plate mounted on said frame for sliding adjustment across the same, a second plate mounted on said first plate for sliding adjustment with respect thereto in a direction at right angles to the direction of adjustment of said first mentioned plate, a tool mounted on said second mentioned plate for reciprocation, a reversible motor mounted on said second mentioned plate, a driving connection between said motor and said tool whereby the former is effective to reciprocate the latter, a switch device for controlling said motor, and means whereby reciprocation of said tool actuates said switch device.

20. In a machine of the character described, guide means for a tool support, a tool support mounted for vertical reciprocation on said guide means, a rotary tool carried by said support, a motor carried by said support connected with said tool for rotating same, and counterbalance means relieving said guide means of the weight of said tool support and the parts carried thereby.

21. In a machine of the character described, a frame, a plate mounted on said frame for sliding adjustment across the same, a second plate mounted on said first plate for sliding adjustment with respect thereto in a direction at right angles to the direction of adjustment of said first mentioned plate, guide means carried by said second mentioned plate, a tool support mounted for reciprocation along said guide means, a tool and a motor in driving connection therewith mounted on said tool support, a rotary screw shaft mounted parallel to said guide means, a connection between said tool support and said screw shaft whereby rotation of the latter is effective to move the former along said guide means, a reversible motor in driving relation to said screw shaft, and means operable by movement of said tool support along said guide means to reverse said motor.

22. In a machine of the character described, a frame, a plate mounted on said frame for sliding adjustment across the same, a second plate mounted on said first plate for sliding adjustment with respect thereto in a direction at right angles to the direction of adjustment of said first mentioned plate, a tool carried by said second mentioned plate, a screw member carried by said first plate cooperating with a nut carried by said second plate to effect adjustments of the latter plate, a motor mounted on said frame, a worm carried by said motor, a shaft mounted on said frame carrying a worm wheel in mesh with the worm of said motor, a shaft mounted on said first mentioned plate carrying a worm in mesh with a worm wheel on said screw member, and a splined, telescoping connection between said shafts, whereby said motor is effective to adjust said second mentioned plate in any position of adjustment of said first named plate.

23. In a machine of the character described, a frame, a tool carrying plate mounted on said frame for sliding adjustment across the same, a nut carried by said plate, a screw member in threaded engagement with said nut rotatable to effect adjustments of said plate, a gear wheel loose on said screw member, a motor in driving relation to said gear wheel, a hand wheel splined to and movable longitudinally of said screw member, and cooperating clutch formations between said gear wheel and said hand wheel movable into and out of engagement by movement of said hand wheel longitudinally of said screw shaft.

24. In a machine of the character described, a frame, a pair of plates mounted on said frame for sliding adjustment in like directions thereacross, a pair of tool carrying plates mounted, respectively, on said first plates for adjustments with respect thereto in directions at right angles to the direction of adjustment of said first mentioned plates, each of said plates being adjustable independently of the others, and a motor mounted on said frame connected with said second mentioned pair of plates effective in any relative adjustment of said plates to adjust said second mentioned pair of plates simultaneously.

25. A machine of the character described comprising a head stock, a tail stock, means for rotatably supporting a piece of material to be operated on by and between said stocks, means for holding the material against rotation, and a tool on the head stock for operation on a piece of material supported between said stocks, said tool being movable in a direction transverse with respect to the axis of rotation of the material.

26. A machine of the character described comprising a head stock, a tail stock, means for rotatably supporting a piece of material to be operated on by and between said stocks, means for holding the material against rotation, a tool on the head stock for operation on a piece of material supported between said stocks, and means for reciprocating said tool in a direction transverse with respect to the axis of rotation of the material.

In testimony whereof we hereunto affix our signatures.

FREDERICK A. GREARSON.
WILLIS A. LANE.